United States Patent [19]
Brandon

[11] Patent Number: 5,511,941
[45] Date of Patent: Apr. 30, 1996

[54] STEAM TURBINE SHELL DISASSEMBLY METHOD

[76] Inventor: Ronald E. Brandon, 652 Jubilee St., Melbourne, Fla. 32940

[21] Appl. No.: 380,120

[22] Filed: Jan. 30, 1995

[51] Int. Cl.$^6$ ............................................. F01D 25/24
[52] U.S. Cl. .................................... 415/214.1; 411/395
[58] Field of Search ...................... 415/214.1; 403/11, 403/12, 28, 30, 32; 285/18, 23, 187, 373, 419; 411/395, 903, 908, 916

[56] References Cited

U.S. PATENT DOCUMENTS

| | | | |
|---|---|---|---|
| 1,839,849 | 1/1932 | Hodgkinson | 415/214.1 |
| 4,206,060 | 6/1980 | Yamamoto et al. | 411/902 |
| 4,991,563 | 2/1991 | Ashley | 411/916 |
| 5,063,661 | 11/1991 | Lindsay | 415/214.1 |

FOREIGN PATENT DOCUMENTS 3542073  6/1987  Germany ........................... 415/214.1

Primary Examiner—Edward K. Look
Assistant Examiner—James A. Larson
Attorney, Agent, or Firm—Ross, Ross & Flavin

[57] ABSTRACT

In a steam turbine shell which includes a horizontal joint, flanges and bolts or studs, washers and nuts, the provision of special disassembly bolts or studs, washers and nuts to be used to replace certain initially removed operating bolts or studs, washers and nuts to accept the forces which would normally build up on the remaining operating bolts or studs or washers, or nuts caused by the tendency of the shell to distort as bolts or studs, washers and nuts are removed, the special disassembly bolts or studs, or washers, or nuts having special characteristics, including a high thermal coefficient of expansion, the special disassembly bolts and washers being coated with a friction reducing compound and having high short term strength to enable their easy removal, even from a distorted shell.

5 Claims, 2 Drawing Sheets

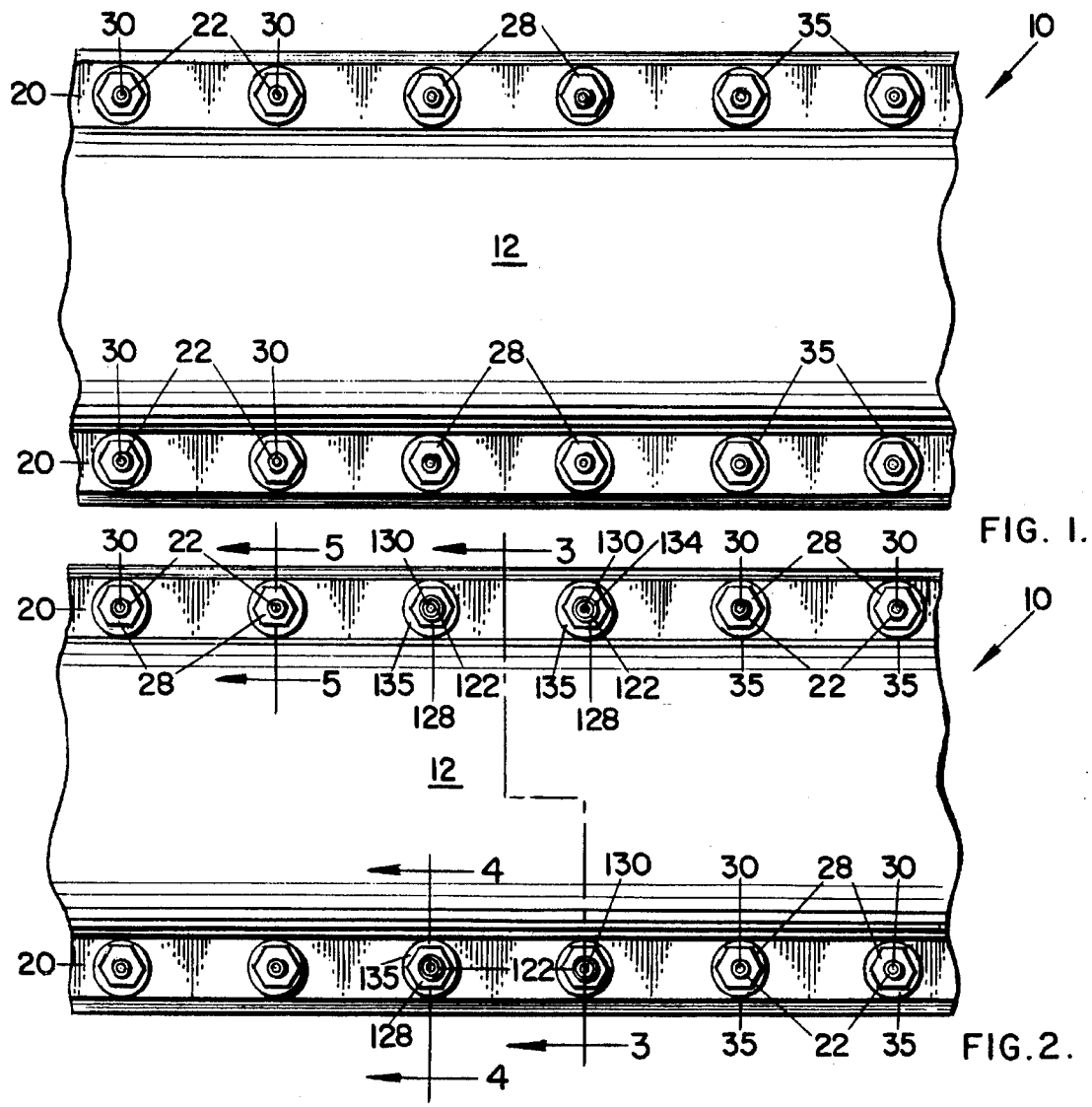
FIG. 1.
FIG. 2.
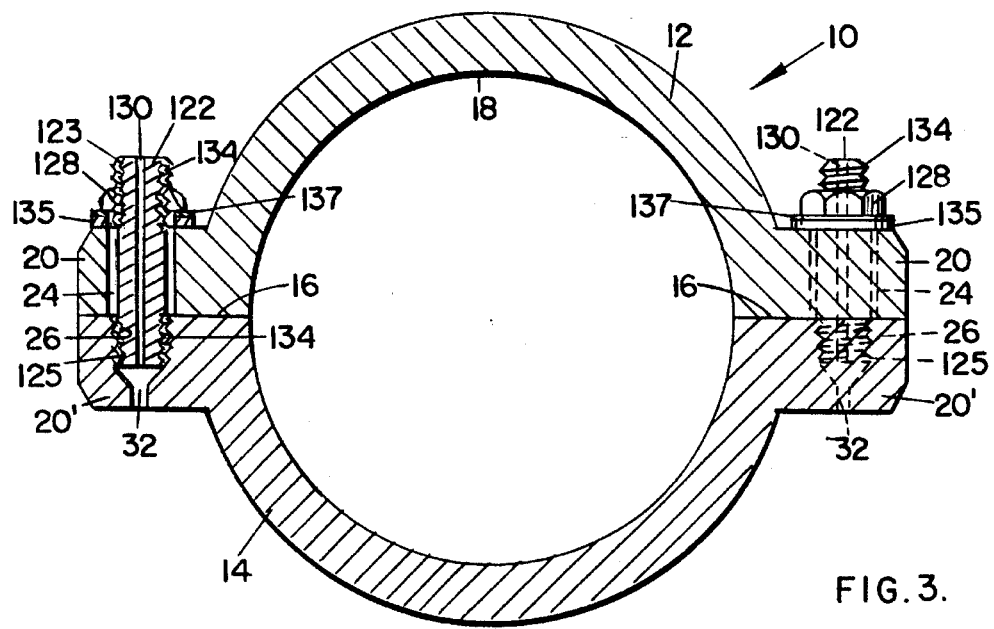
FIG. 3.

STEAM TURBINE SHELL DISASSEMBLY METHOD

BACKGROUND OF THE INVENTION

1. Field of the Invention

This invention relates to steam turbine shells and the flange bolts or studs, nuts and washers therefor.

2. Description of the Prior Art

Steam and gas turbines often employ shells which are made of two approximately 180° half circular, flanged segments which surround the turbine shaft and other components. The two segments are held together by a series of bolts or studs and nuts which, when tightened, compress the flanged portions of the shells to form a 360° circle capable of containing hot, high pressure fluid as well as internal flow components including seals.

Turbines, after assembly, normally operate at high temperature and pressure for long periods of time, often for a duration of over 5 years between overhauls. During such period of operation there will occur events, such as start-up and shutdown, when thermal gradients create high stress in the shells well beyond the recognized steady state stress that exists during normal operation.

These stress conditions normally create a tendency for shells to gradually become non-round. When this occurs, there is an increase in stud and flange stress as these components exert great force to prevent the shells from becoming non-round.

When a turbine is shut down for disassembly the bolts or studs and nuts are untightened one-by-one to allow removal of the upper half shell to provide access to the internal components. As each bolt and nut is loosened or removed, the forces necessary to prevent the shell from springing to a non-round condition are increased on those bolts and nuts which have not yet been loosened.

These forces, when combined with the normal bolt force, cause a much greater friction load on the bolt threads, thus making loosening of the bolt or stud and nut very difficult. It is often necessary to burn off several expensive bolts or nuts to accomplish their removal, often involving more than a day's loss in the critical period of the turbine outage resulting in great cost.

SUMMARY OF THE INVENTION

It is an object of the invention to reduce or eliminate the frequent necessity to burn studs or nuts to permit their removal during turbine disassembly. It is a further object to reduce the time consuming task of overheating stuck studs and nuts to reduce thread friction.

The invention is practiced by removing one or two operating nuts, and/or studs and their washers near the center of the shell span on each side. These are then replaced by special disassembly studs, nuts and washers which have improved strength, a high thermal expansion coefficient, reduced friction, and increased ability for applying torque. By tightening these nuts and studs in locations where the running bolts have been removed, the removal of adjacent operating or running studs, nuts and washers is greatly facilitated.

After the remaining operating or running studs, nuts and washers are removed, it will still be relatively easy to remove the special disassembly studs, nuts and washers.

The special disassembly nuts, studs and washers include a combination of special features not provided in prior running bolts, studs, nuts, or washers. These features include:

surfaces which have not deteriorated during operation thereby avoiding increased friction;

materials specially selected and machined to resist galling;

materials selected to have great short term strength as opposed to the long term strength required of running studs and nuts;

use of fresh coatings to reduce thread and nut-to-washer surface friction; and selection of a material with a large thermal coefficient of expansion so that moderate heating will create the greatest potential for relieving thread load when disassembly is desired.

The combination of characteristics described above is desirable only for bolts, studs, nuts and washers that are used temporarily during shell disassembly, as opposed to operating or running bolts, nuts, studs and washers that are employed during turbine operation.

BRIEF DESCRIPTION OF THE DRAWINGS

FIG. 1 is a top plan view of a turbine shell before installation of the special disassembly studs, nuts and washers of the invention;

FIG. 2 is a top plan view of the turbine shell of FIG. 1 following installation of the special assembly studs, nuts and washers of the invention;

FIG. 3 is a cross sectional view taken on line 3—3 of FIG. 2;

DESCRIPTION OF THE PREFERRED EMBODIMENTS

FIG. 1 is a top plan view of a typical turbine shell 10 to which the invention can be applied.

Figure 5:
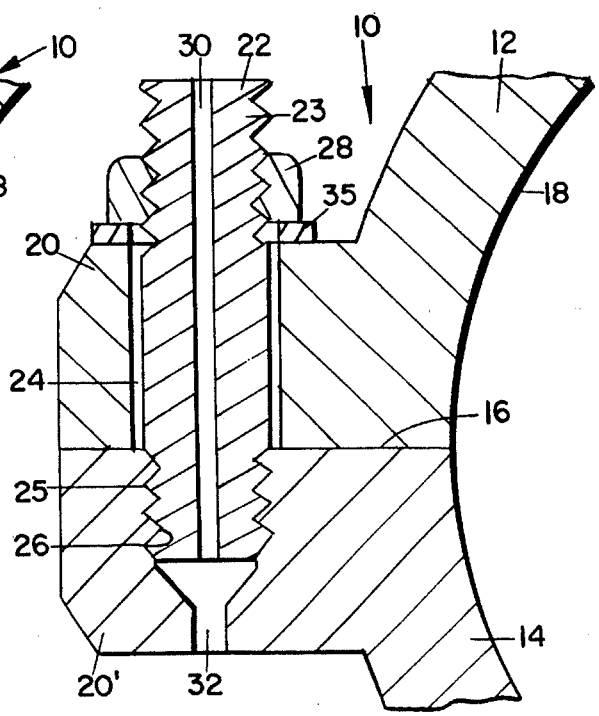
FIG. 5 is an enlarged, fragmentary, cross-sectional view of one of the operating or running studs, nuts and washers taken on line 5—5 of FIG. 2.

As best seen in FIGS. 1 and 5, shell 10 is composed of arcuate, longitudinally-extending, mating upper and lower half-parts or segments 12 and 14, respectively, of approximately 180°, semi-circular configuration which, when mated together, form a 360° ring divided at a horizontal joint 16 and having an arcuate inner face 18 which surrounds a turbine shaft and seals and other components, not shown.

Upper half-part 12 includes integral, longitudinally-extending, flanges 20 which extend horizontally outwardly from its opposite side faces at horizontal joint 16.

Lower half-part 14 includes similar flanges 20' which extend horizontally outwardly from the opposite side faces of lower half-part 14 and are in mating contact with flanges 20 of the upper half-part at horizontal joint 16.

As best seen in FIGS. 1 and 5, half-parts 12 and 14 are held together by a series of spaced, operating or running studs or bolts 22 which are threaded at their upper ends at 23 and are threaded at their lower ends at 25.

Studs or bolts 22 extend vertically downwardly through provided openings 24 in upper flanges 20 of the upper half-part and their threaded lower ends 25 are threadedly engaged in threaded openings 26 in lower flanges 20'.

Nuts 28 are threadedly engaged with threaded upper ends 23 of studs 22 to create a tight seal between shell half-parts 12 and 14 at horizontal joint 16. Washers 35 are sleeved on studs 22 between nuts 28 and shell upper flange 20.

During assembly, care is taken to tighten and stretch each stud 22 to provide a strong and known force to insure flange-to-flange contact.

To assist in creating a proper amount of stretching in studs 22, the studs are often heated relative to the shell flanges by flame jets or heating rods, not shown, inserted into central openings 30 which extend vertically through each stud 22 and are aligned with openings 32 provided in lower flanges 20' which communicate with threaded openings 26 in the lower flanges.

Figure 6:
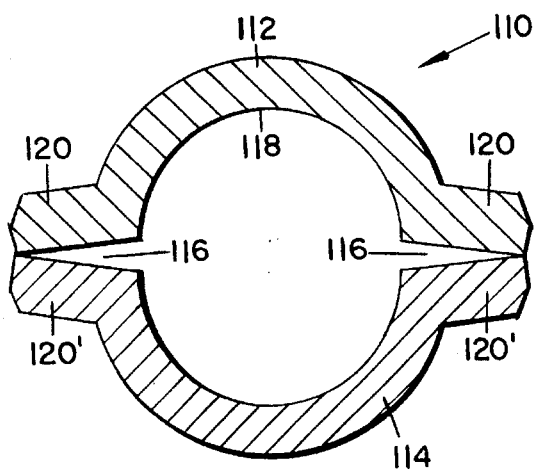
FIG. 6 is a partial cross sectional view of an unbolted turbine shell showing one type of typical shell distortion.
Figure 7:
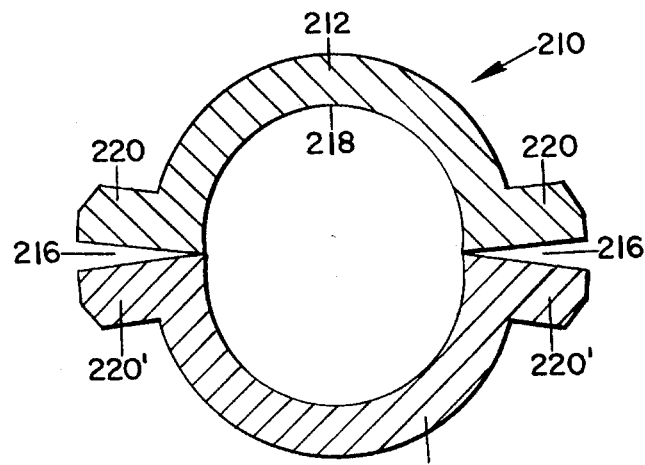
FIG. 7 is a partial cross sectional view of an unbolted turbine shell showing another type of shell distortion.

High stress conditions in shell 10 occasioned by extended periods of operation under conditions of extreme heat and pressure fluctuations create a tendency for the shell half-parts to become non-round as illustrated in FIGS. 6 and 7.

In FIG. 6, a shell 110 includes an upper half-part 112 having integral flanges 120 and a lower half-part 114 having integral flanges 120'.

In this instance a shell arcuate inner face 118 has become non-round so that the flanges of the half-parts are no longer flush, but are angularized with respect to each other to create a space 116 which extends into the shell interior.

In FIG. 7, a shell 210 includes an upper half-part 212 having integral flanges 220 and a lower half-part 214 having integral flanges 220'.

In this instance a shell arcuate inner face 218 has become non-round so that the flanges of the half-parts are no longer flush, but are angularized with respect to each other to create a space 216 between the outer ends of the flanges.

When shell half-parts become non-round, as seen in FIGS. 6 and 7, an increased load is placed on studs 22 to cause increased friction on threads 23 and 25 and increased friction between nuts 28 and washers 35, thereby making it much more difficult to turn the nuts when removal is desired. This also increases the tendency for galling of threads 23 and 25 of studs 22. There is also a strong probability of deterioration of the threads of the studs after long operating periods at high temperature.

The condition becomes more extreme as nuts 28 are removed, causing the remaining studs 22 to be subjected to further increased stretching force caused by non-round shells.

Figure 4:
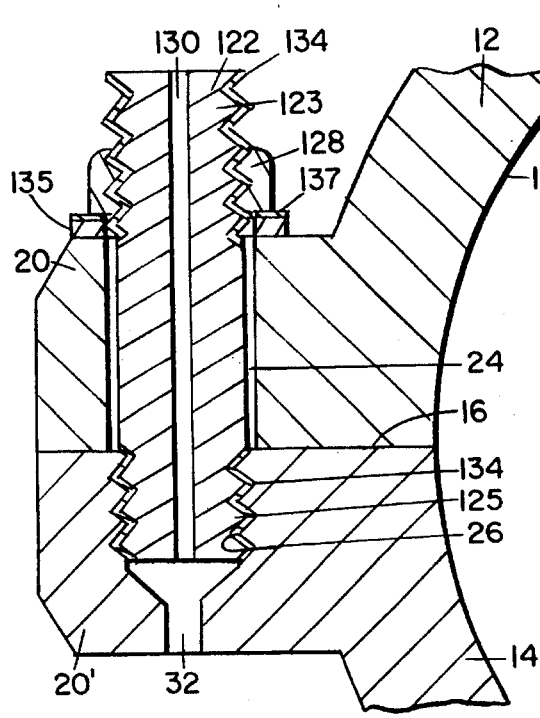
FIG. 4 is an enlarged, fragmentary, cross sectional view of one of the special disassembly studs, nuts and washers of the invention taken on line 4—4 of FIG. 2.

To avoid these difficulties, and as shown in FIGS. 2–4, certain of operating or running studs 22, nuts 28 and washers 35 are removed and special opening or disassembly studs 122, nuts 128 and washers 135 are installed at the positions of the several operating or running studs 22, nuts 28 and washers 35 which are normally removed first, preferably near the center of the shell span, where the out-of-roundness tendencies are the greatest.

However, special disassembly studs 122, nuts 128 and washers 135 may be installed adjacent any location where running nuts 28 show a tendency to resist turning.

Special disassembly studs 122, nuts 128 and washers 135 are fabricated from a material, such as A286 stainless steel, having a higher thermal coefficient of expansion than shell flanges 20, with resistance to galling and with high strength at temperatures of 1000° F. and above.

Special disassembly studs 122 are provided with central openings 130 which extend vertically therethrough, into which flame jets or heating rods, not shown, may be inserted to insure a proper amount of stretching in the studs.

Special disassembly studs 122 are threaded at their upper ends at 123 and are threaded at their lower ends at 125, the threads of studs 122 and those of nuts 128 being of highly accurate shape with an excellent surface finish.

Threaded upper and lower ends 123 and 125 respectively of special disassembly studs 122 are provided with a special thin coating 134 of a friction-reducing material such as molybdenum disulfide to facilitate removal of nuts 128 therefrom and their removal from lower flanges 20'.

Special disassembly washers 135 are provided on their upper faces with a special thin coating 137 of a friction-reducing material such as molybdenum disulfide to facilitate removal of nuts 128 from threaded upper ends 123 of special disassembly studs 122.

Washers 135 are sleeved on studs 122 between nuts 128 and shell upper flange 20, with coating 137 of the washers contacting the lower face of the nuts.

Washers 135 must be machined to be very flat, with an excellent surface finish.

Nuts 128, and an associated wrench, not shown, for turning the nuts, must be accurately machined to insure a close fit.

I claim:

1. In a steam turbine shell having arcuate upper and lower half-parts each with integral flanges which meet at a horizontal joint and are held in tight face-to-face contact at the horizontal joint during turbine operation by operating or running studs, nuts and washers, a method which comprises initial removal of certain of the operating or running studs, nuts and washers and replacement thereof with special disassembly studs, nuts and washers selected from materials having a high thermal coefficient of expansion, great resistance to galling and great short term strength, the threads of the special disassembly studs and the washers being provided with a coating to decrease friction, thereby preventing distortion of the shell and facilitating subsequent removal of the remaining operating or running studs, nuts and washers during shell disassembly.

2. A method according to claim 1, wherein the special disassembly studs, nuts and washers are fabricated from A286 stainless steel.

3. A method according to claim 1, wherein the coating on the threads of the special disassembly studs and on the washers is molybdenum disulfide.

4. A method according to claim 1, including means permitting electrical and gas flame heating of the special disassembly studs and nuts.

5. A method according to claim 1, wherein the operating or running studs, nuts and washers initially removed were located near the center of the shell span.

\* \* \* \* \*